(12) United States Patent
Hulse

(10) Patent No.: US 6,244,734 B1
(45) Date of Patent: Jun. 12, 2001

(54) STEP-UP/RUNNING BOARD OPTICAL WAVEGUIDE ILLUMINATION ASSEMBLY

(75) Inventor: George R. Hulse, Cookeville, TN (US)

(73) Assignee: Cooper Automotive Products, Inc., Houston, TX (US)

( * ) Notice: Subject to any disclaimer, the term of this patent is extended or adjusted under 35 U.S.C. 154(b) by 0 days.

(21) Appl. No.: 09/157,373

(22) Filed: Sep. 21, 1998

Related U.S. Application Data

(63) Continuation of application No. 09/009,836, filed on Jan. 20, 1998.
(60) Provisional application No. 60/069,118, filed on Dec. 9, 1997.

(51) Int. Cl.$^7$ .................................................. B60Q 1/24
(52) U.S. Cl. ........................ 362/495; 362/511; 362/560; 362/581; 362/583; 362/551
(58) Field of Search ................................... 362/551, 554, 362/583, 560, 581, 487, 495, 511

(56) References Cited

U.S. PATENT DOCUMENTS

| | | | |
|---|---|---|---|
| 1,481,057 | 1/1924 | Gott ....................................... | 362/495 |
| 2,010,374 | 8/1935 | Pissis ..................................... | 362/495 |
| 2,214,447 | 9/1940 | Bave ...................................... | 362/487 |
| 2,561,756 * | 7/1951 | Shook ................................... | 362/495 |
| 3,740,113 * | 6/1973 | Cass ...................................... | 385/125 |
| 3,832,028 | 8/1974 | Kapron . | |
| 3,901,581 | 8/1975 | Thiel . | |
| 4,241,382 * | 12/1980 | Daniel ................................. | 362/581 |
| 4,824,194 | 4/1989 | Karasawa . | |
| 4,885,663 | 12/1989 | Parker . | |
| 4,907,132 | 3/1990 | Parker . | |
| 5,005,108 | 4/1991 | Pristash et al. . | |
| 5,042,892 | 8/1991 | Chiu et al. . | |
| 5,136,480 | 8/1992 | Pristash et al. . | |
| 5,228,773 * | 7/1993 | Win ...................................... | 362/339 |
| 5,400,224 * | 3/1995 | DuNah et al. ........................ | 362/31 |
| 5,410,454 | 4/1995 | Murase et al. . | |
| 5,567,031 * | 10/1996 | Davenport et al. .................. | 362/551 |
| 5,584,556 | 12/1996 | Yokoyama et al. . | |
| 5,590,945 | 1/1997 | Simms . | |
| 5,613,751 | 3/1997 | Parker et al. . | |
| 5,618,096 | 4/1997 | Parker et al. . | |
| 5,664,862 * | 9/1997 | Redmond et al. .................... | 362/31 |
| 5,668,913 | 9/1997 | Tai et al. . | |
| 5,791,756 | 8/1998 | Hulse et al. . | |
| 5,812,714 | 9/1998 | Hulse . | |
| 5,915,830 * | 6/1999 | Dickson et al. ..................... | 362/495 |
| 6,082,870 | 7/2000 | George . | |

OTHER PUBLICATIONS

Hulse et al., "Analysis of Waveguide Geometries at Bends and Branches for the Directing of Light", Paper No. 98?????, pp. 1–6.

Hulse, "Focus–less Optics and Their Use in Automotive Distributed Lighting Systems", SAE Technical Paper Series 970252, SAE International, International Congress & Exposition, Detroit, Michigan, Feb. 24–27, 1997, pp. 1–5.

Hulse et al, "HID Driven Focus–less Optics System for Complete Automotive Distributed Lighting Systems", Paper No. 98?????, pp. 1–3.

Hulse et al., "Three Specific Design Issues Associated With Automotive Distributed Lighting Systems: Size, Efficiency, and Reliability", SAE Technical Paper Series 960492, SAE International, International Congress & Exposition, Detroit, Michigan, Feb.

* cited by examiner

Primary Examiner—Thomas M. Sember
Assistant Examiner—Ismael Negron
(74) Attorney, Agent, or Firm—Reising, Ethington, Barnes, Kisselle, Learman & McCulloch, P.C.

(57) ABSTRACT

An illuminated step-up for a vehicle includes a step-up plate mounted on the door sill of a vehicle. A slot extends along a portion of the length of the step-up plate. An optical waveguide formed from a solid piece of material is positioned to release light through the slot.

54 Claims, 15 Drawing Sheets

STEP-UP/RUNNING BOARD OPTICAL WAVEGUIDE ILLUMINATION ASSEMBLY

CROSS REFERENCE TO RELATED APPLICATIONS

This application claims priority from Provisional Application No. 60/069,118, "HID DRIVEN FOCUS-LESS OPTICS SYSTEM," filed Dec. 9, 1997 and Application No. 09/009,836, "DISTRIBUTED LIGHTING SYSTEM," filed Jan. 20, 1998, both of which are incorporated by reference.

BACKGROUND

The invention relates to distributed lighting systems.

Distributed lighting systems distribute light from one or more light sources in central or strategic locations to one or more remote locations. A distributed lighting system promises several advantages over conventional lighting techniques, including low power consumption, extended life, heat reduction where the light is emitted, and increased design flexibility.

SUMMARY

The invention provides components of a distributed lighting system (DLS) for use, for example, in an automobile. Issues associated with incorporating a distributed lighting system into an automobile are discussed by Hulse, Lane, and Woodward in "Three Specific Design Issues Associated with Automotive Distributed Lighting Systems: Size, Efficiency and Reliability," SAE Technical Paper Series, Paper No. 960492, which was presented at the SAE International Congress and Exposition, Detroit, Mich., Feb. 26–29, 1996, and Hulse and Mullican in "Analysis of Waveguide Geometries at Bends and Branches for the Directing of Light," SAE Technical Paper Series, Paper No. 981189, which are incorporated herein by reference.

The illuminated step-ups and running boards provide aesthetically pleasing lighting effects for a vehicle. The optical waveguide configurations employed in these lighting assemblies provide several advantages. For example, the step-ups and running boards are illuminated along their lengths without the use of long, tubular light sources, such as neon or fluorescent tubes, that may be susceptible to failure and breakage. This feature is particularly important because the step-ups and running boards are located where they may suffer impacts as people enter or exit a vehicle. In addition, the waveguides may be formed from injection-molded plastic or acrylic, resulting in increased durability and reduced manufacturing and installation cost compared to fiber optics or other types of light transmission conduits.

In one general aspect, an illuminated step-up for a vehicle includes a step-up plate mounted on the door sill of a vehicle. A slot extends along a portion of a length of the step-up plate. An optical waveguide formed from a solid piece of material is positioned to release light through the slot.

Embodiments may include one or more of the following features. An illumination portion of the waveguide may have top and bottom surfaces and may be configured to release light from the top surface. A first input face at one end of the illumination portion may be configured to receive light from a first light source. A second input face at an opposite end of the illumination portion may be configured to receive light from a second light source. The bottom and/or the top surface may be stippled. The bottom and/or top surface may be at least partially covered with diffusing material.

The waveguide may be divided into first and second portions. A reflector may be positioned between the first and second portions of the waveguide and configured to receive a light source and direct light into the first and second portions. Colored filters may be positioned between the reflector and the first and second portions.

Snaps may extend from the top surface and may be configured to mount the illumination portion on the step-up plate. A light source receptacle may be positioned to hold a light source at the first input face.

In another general aspect, an illuminated running board for a vehicle includes a running board plate positioned on the top surface of a running board that forms a ledge extending from the vehicle along the length of a vehicle door opening. A slot extends along a portion of a length of the running board plate. An optical waveguide formed from a piece of solid material is positioned to release light through the slot.

The illuminated step-up and/or running board may be included in a vehicle.

Other features and advantages will be apparent from the following detailed description, including the drawings, and from the claims.

DESCRIPTION

Figure 1:
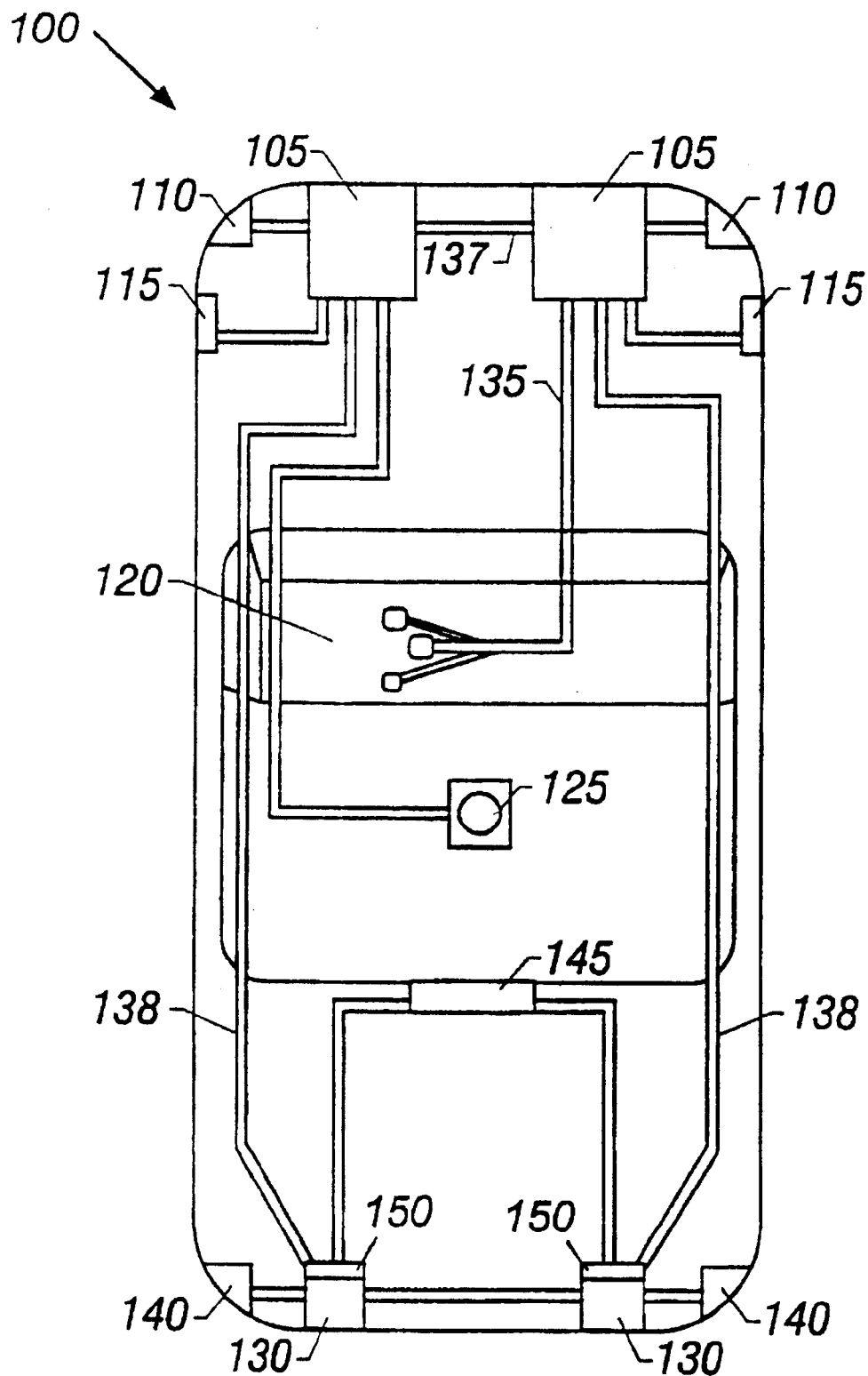
FIG. 1 is a block diagram of a vehicle distributed lighting system with hybrid lighting subsystems.

Referring to FIG. 1, a vehicle distributed lighting system (DLS) 100 includes hybrid headlamp subsystems, turn signal subsystems 110 and, and hybrid tail light subsystems 130. The hybrid headlamp subsystems 105 provide primary forward illumination for the vehicle. The headlamp subsystems 105 are also light sources for other exterior lights, such as front turn signals of the subsystems 110 and side markers 115, as well as interior lights, such as dashboard lights 120 and dome lights 125. These other lights are connected to the headlamp subsystems by optical waveguides 135 or optical fibers. Similarly, the tail light subsystems 130 provide light for rear turn signals 140 and a center high mounted stop light (CHMSL) 145. The subsystems of the DLS are interconnected so that the light source of one subsystem serves as a redundant light source for another subsystem.

The DLS incorporates different types of optical waveguide structures to distribute light throughout the vehicle. These include joints, elements with epoxy coatings, pinched end collector portions, integrated installation snaps, integrated input optics and integrated output lenses. The DLS also includes waveguide structures to provide illumination to portions of the vehicle interior, including cup holders, assist grips, and storage pockets.

Figure 2:
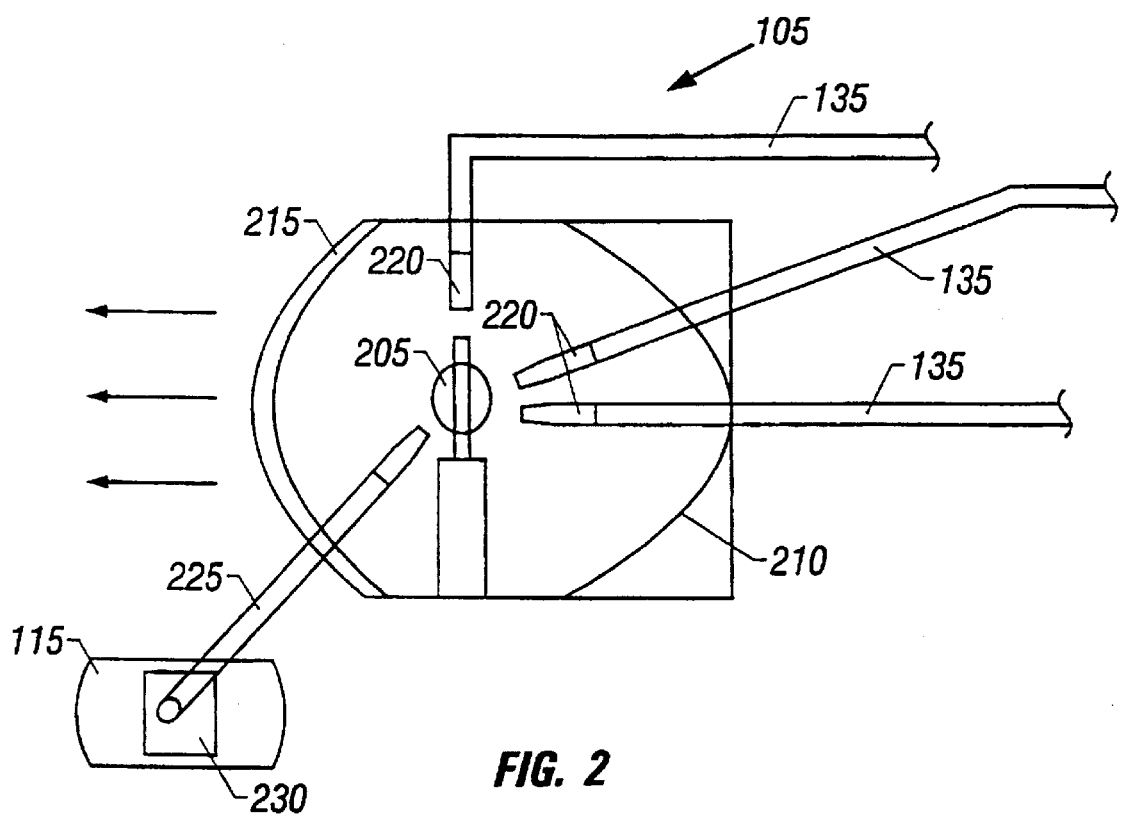
FIG. 2 shows a hybrid headlamp subsystem.

FIG. 2 illustrates a hybrid headlamp subsystem 105. The subsystem includes a light source 205 that may be implemented using, for example, a high-intensity discharge (HID) lamp. Light produced by the light source 205 is collected by a reflector 210 and directed through a lens 215 to provide the primary forward illumination for the vehicle. The reflector may be implemented as a parabolic or complex reflector.

In addition to providing the primary forward illumination, the light source 205 acts as a light source for other parts of the system. As shown in FIG. 2, waveguides 135 having collector elements 220 at their ends are positioned close to the light source 205 to receive light and transmit the light to other locations in the vehicle, such as to provide turn signals, interior lighting, fog lights, and side markers. The waveguides 135 may also carry light to other lighting subsystems to provide redundancy, such as the opposite side headlamp or the tail lights. The number of collector elements 220 may be increased as necessary to supply light for other lighting functions. The collector elements 220 may be glass rods (such as Pyrex) with ends that are polished so as to be faceted or pinched. The pinched ends increase the acceptance angle of the collector element.

FIG. 2. shows a waveguide 225 that carries light from the source to a side marker light 115. The waveguide 225 may include colored plastic filters 230 to provide a desired output color (e.g., amber) for the side marker 115. This configuration eliminates the need for an electrical connection and light bulb in the side marker 115.

Another waveguide provides light to the turn signal subsystem 110. Alternatively, the turn signal subsystem 110 may include an independent light source and may use the input from the headlamp subsystem 105 for redundancy.

Referring again to FIG. 1, waveguides or optical fibers also may carry light from the headlamp subsystem to other subsystems that have their own light sources, such as the opposite headlamp subsystem (waveguide 137) or the corresponding tail light subsystem (waveguide 138), to provide light source redundancy. When redundancy is employed and, for example, one of the headlamps fails, light from the operational headlamp will dimly illuminate the failed headlamp. This is safer for the operator of the vehicle than having only one operational headlamp. Redundancy also may be used to reduce the effects of failure of other lighting components. For example, an incandescent PC bulb (i.e., a small bulb designed to be mounted on a printed circuit board) may be used as a source for trunk lighting and may be connected to provide redundancy to interior reading lights.

Figure 3A:
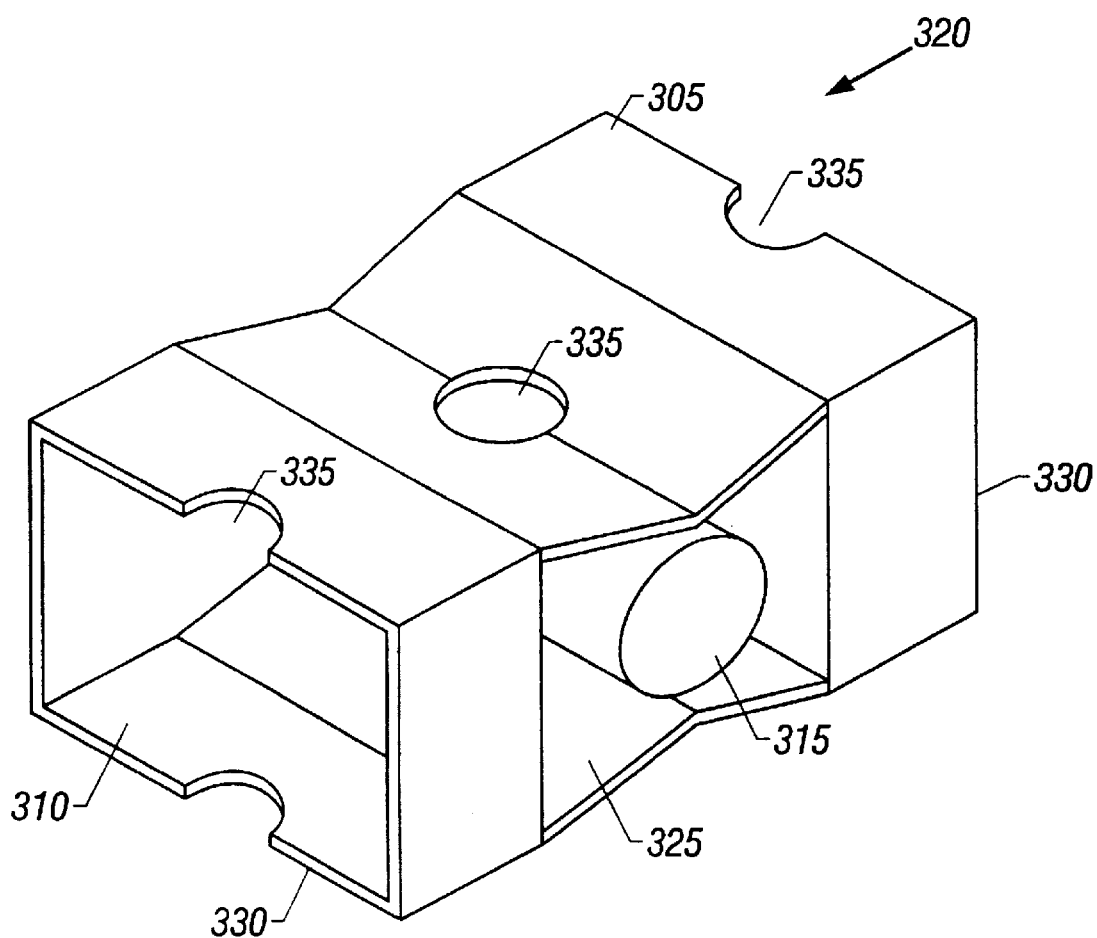
FIGS. 3A and 3B show compact illuminators.

As shown in FIG. 3A, a compact illuminator 320 may be used as a light source. The compact illuminator 320 includes a reflector 305 with reflective, heat-dissipating surfaces 310. The reflective surfaces 325 nearest the light source 315 are angled to more efficiently direct light to the output ports 330. However, the surfaces 325 may also be curved (e.g., parabolic or elliptical in shape) rather than planar. The reflector 305 includes vent holes 335 to reduce heat in the compact illuminator 320. The reflector 305 is easily formed from one or two pieces of stamped metal, resulting in low manufacturing costs. The reflective surfaces 325 may be formed by vapor deposition on plastic or other materials.

Figure 3B:
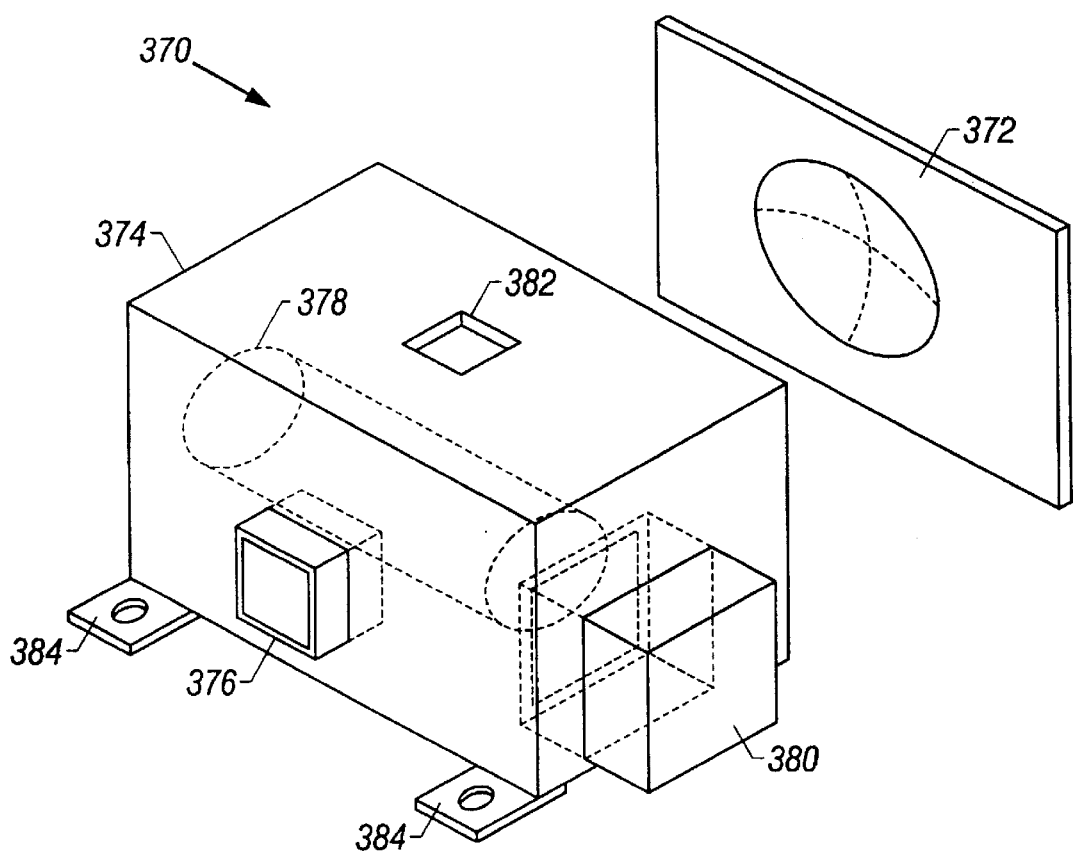

FIG. 3B shows a dual-source, hybrid compact illuminator 370 that provides a direct lighting function through a lens 372 covering one side of the housing 374 and a distributed lighting function through a waveguide output port 376. The housing 374 may be formed of metal or plastic (e.g., injected molded plastic). The hybrid compact illuminator 370 has reflective interior walls and a primary light source 378, such as a cartridge bulb. The interior walls may be curved to form a reflector to increase light collection efficiency. The waveguide output port 376 is configured so that an optical waveguide may be inserted into the port and held in position with an adhesive, such as epoxy, or by mechanical means, such as a waveguide connector. The waveguide output port 376 is positioned so that the input face of the inserted optical waveguide efficiently receives light from the primary light source. The compact illuminator may have additional waveguide output ports positioned on the other sides of the housing 374. The end of the inserted waveguide may have optical collector elements or lenses formed on the input face, as described above.

The dual-source hybrid compact illuminator 370 also has a secondary light source, e.g., a cartridge bulb or a PC bulb, in a compartment 380 that protrudes from the side of the housing 374 (a single-source, hybrid compact illuminator having only a primary light source is also possible). The secondary light source may be used for lighting functions that require a lower power, longer life light source. The compartment 380 may have a waveguide output port to provide a distributed lighting function or an output lens to provide a direct lighting function.

Alternatively, the compartment 380 may be open to the interior of the housing and may extend into the housing. The compartment may be positioned so that the secondary light source provides illumination for the direct and distributed lighting functions in case of failure of the primary light source 378. Vent holes 382 and installation mounting holes 384 also are provided.

The compact illuminator has a compact size, stays cool, and reduces lamp placement error, which increases efficiency. The compact illuminator also provides a convenient building block for a redundant network to provide interior or exterior lighting functions and may easily be installed in a distributed lighting system. In addition, the hybrid compact illuminator provides both direct and distributed lighting functions.

By combining two sources in a single unit, the dual-source, hybrid compact illuminator provides light for several lighting functions and light source redundancy while lowering complexity and manufacturing costs. For example, a single circuit may be used to drive the two sources. In addition, the dual-source unit reduces the number of parts in a system, which in turn reduces cost and complexity.

Figure 4A:
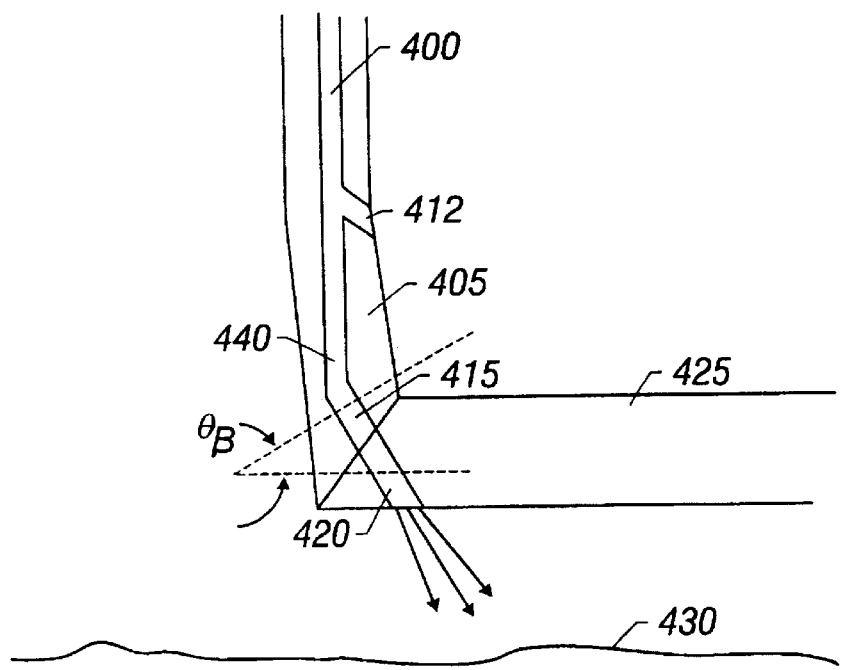
FIGS. 4A and 4B show a combination security/puddle light.
Figure 4B:
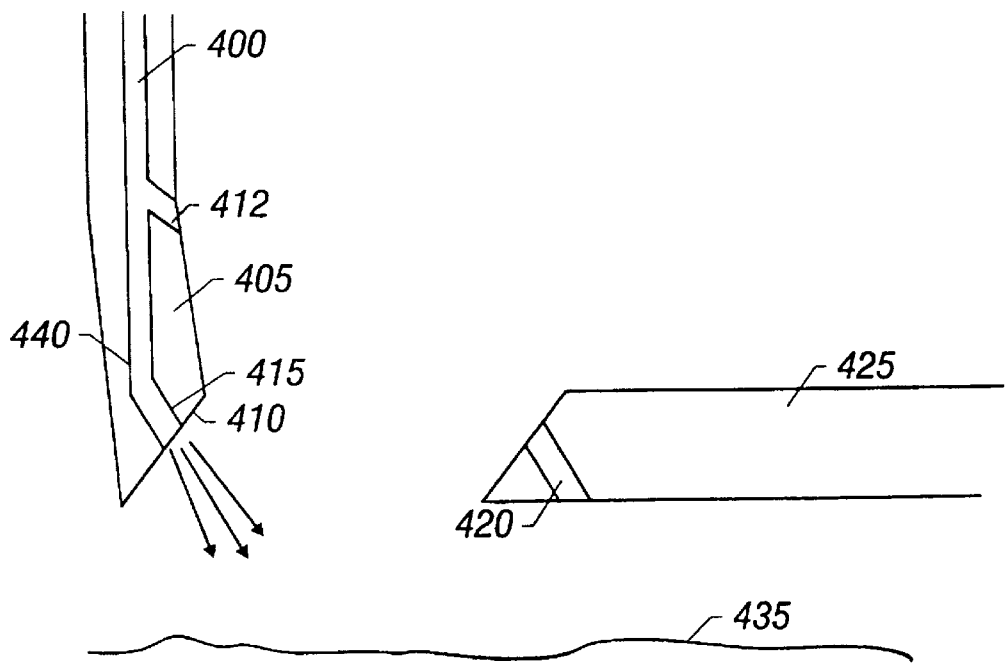

A DLS may be used to provide various lighting functions within a vehicle. For example, a waveguide 400 may be installed in the door 405, as shown in FIGS. 4A and 4B, to provide a security/puddle light. The waveguide 400 runs from a light source, such as the hybrid headlamp subsystem 105 (FIG. 1), to the bottom edge 410 of the door 405. A waveguide branch 412 may be used to implement a interior door light. When the door 405 is closed, as in FIG. 4A, a door waveguide section 415 connects to a floor waveguide section 420 that passes through the floor 425. The floor waveguide section 420 provides a security light that illuminates the area 430 underneath the vehicle. When the door 405 is open, as in FIG. 4B, the door waveguide section 415 provides a puddle light that illuminates the ground 435 between the open door and the vehicle. The bend 440 in the door waveguide section 415 may have a bend angle ($\theta_B$) of, for example, 20°. The bend 440 helps to direct the output of the waveguide 400 to the desired area. Alternatively, the security/puddle light may be implemented as a hybrid subsystem that has an independent light source. The independent light source may directly provide interior lighting for the vehicle in addition to being connected to the waveguide 400 as a light source for the security/puddle light.

Another waveguide carries light from hybrid headlamp subsystem to the interior of the vehicle to provide, for example, dashboard lighting, dome lights, and reading lights. Waveguides also provide unique, aesthetically pleasing lighting effects for certain interior structures, such as cup holders, map pockets, and assist grips.

Figure 5A:
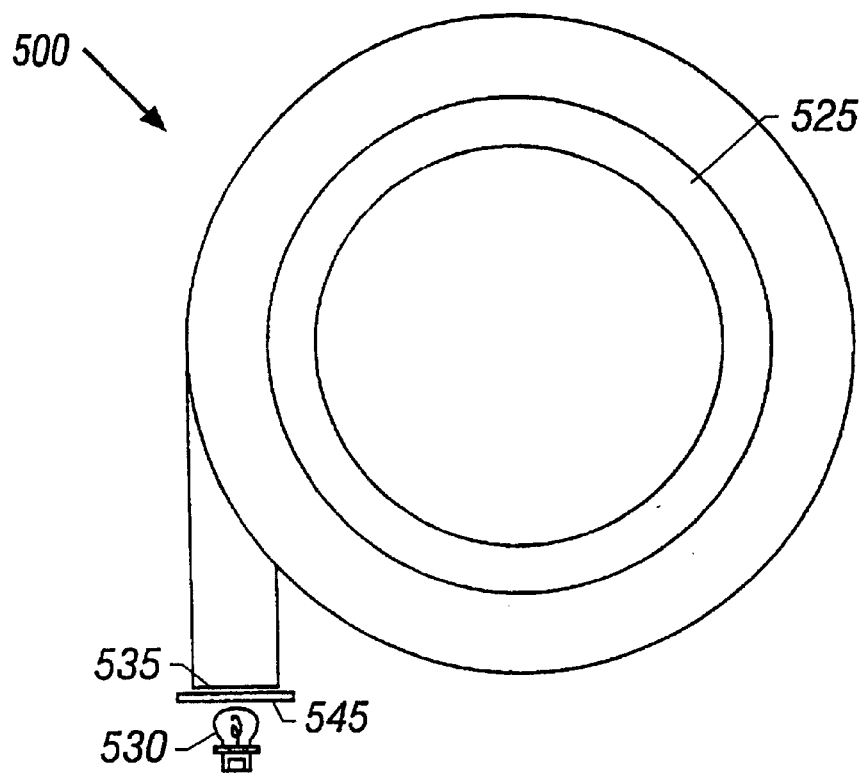
FIGS. 5A and 5B show various embodiments of a cup holder illumination component.
Figure 5B:
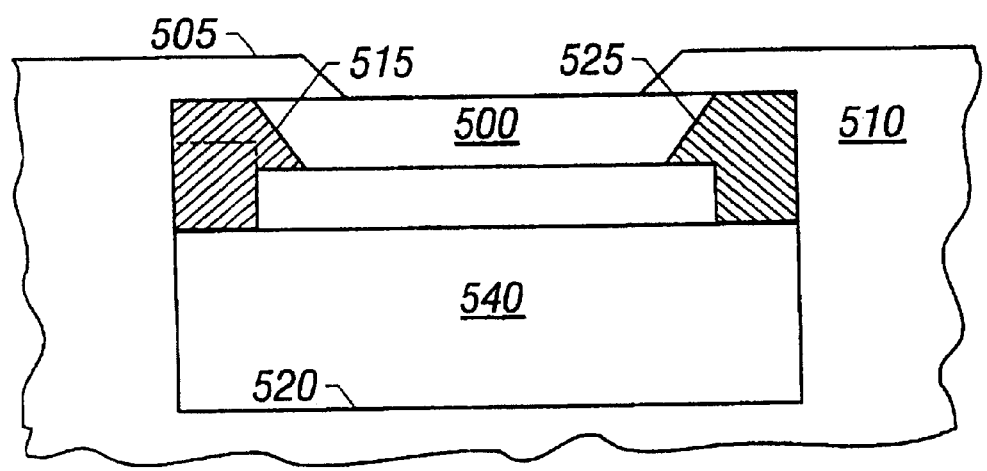

For example, as shown in FIGS. 5A and 5B, a ring-shaped waveguide element 500 may be installed under the lip 505 of a cup holder 510. Although the shape of the waveguide 500 in FIGS. 5A and 5B is circular, any shape may be used depending upon the shape and size of the cup holder 510. The efficiency of the waveguide may be improved by selecting a ratio of the inner radius (r) of the waveguide relative to the width (w) of the waveguide. For example, a waveguide with an inner radius to waveguide width ratio (r/w) of 3:1 will lose less light than a ratio of 1:1 or 0.1:1.

Figure 6A:
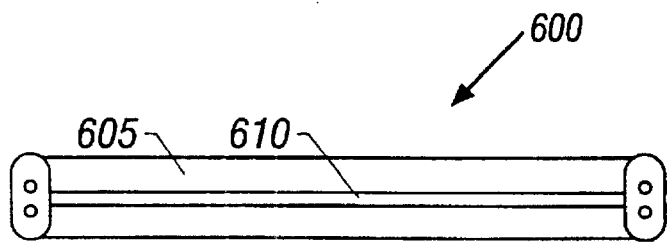
FIG. 6A is a rear view of a waveguide installed in a handgrip.
Figure 6B:
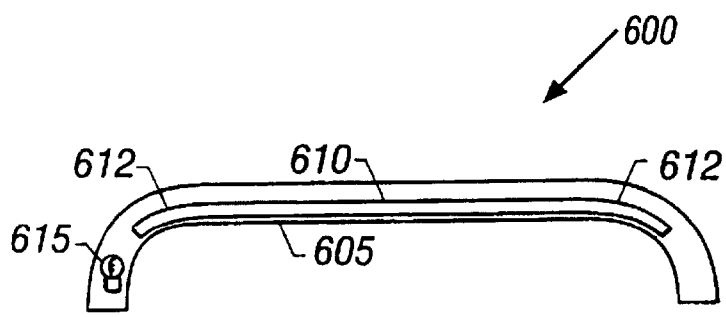
FIG. 6B is a cross-section view of a waveguide and light source installed in a handgrip.
Figure 6C:
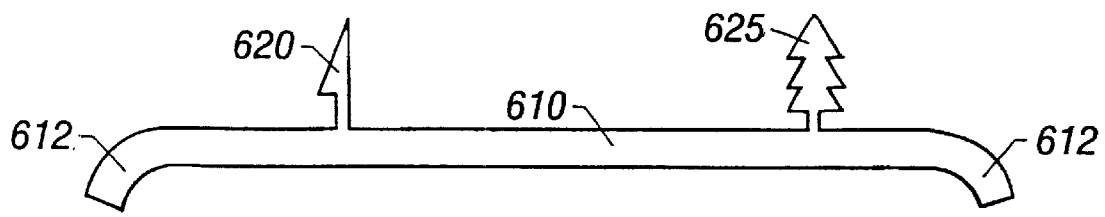
FIG. 6C shows a waveguide with integrated snaps for installation into a handgrip.

Similar structures may be used in the interior of a map pocket or, as shown in FIGS. 6A–6C, along the interior surface 605 of a assist grip 600. A length of waveguide 610 is installed along the interior surface 605. The waveguide includes bends 612 at the ends to conform to the shape of the assist grip. A small incandescent bulb 615 provides a light source. The bulb may be used in conjunction with a lens (not shown) to provide a courtesy light. Alternatively, the assist grip 600 may be connected by a waveguide to another light source in the DLS. As shown in FIG. 6C, the length of waveguide 610 may be formed with snaps 620 and 625 to make installation into the assist grip 600 easier.

Figure 7:
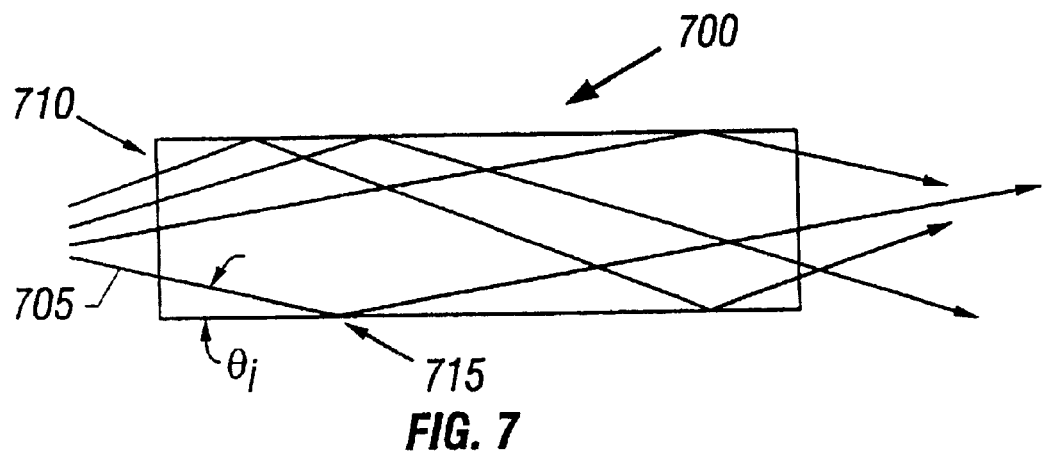
FIG. 7 is a cross-section view of an optical waveguide.

Different types of waveguide structures may be used in the DLS to transmit light from the sources to the lighting outputs. A basic waveguide, as shown in FIG. 7, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve much smaller bend radii than fiber.

As shown in FIG. 7, a light ray 705 entering the input face 710 proceeds through the waveguide 700 until the light ray 705 reaches an outer surface 715 of the waveguide 700, i.e. an interface between the material of the waveguide 700 and air. At the outer surface 715, light is reflected in accordance with Snell's law. If the angle of incidence ($\theta_i$) of the light ray 705 at the outer surface 715 is less than a threshold referred to as the critical angle ($\theta_c$), then the light ray 705 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arcsin(n_a/n_b) = \arcsin(1/1.5) = 41.8$$

where $n_a$ is the index of refraction of air (1.0) and $n_b$ is the index of refraction of acrylic (1.5).

Figure 8A:
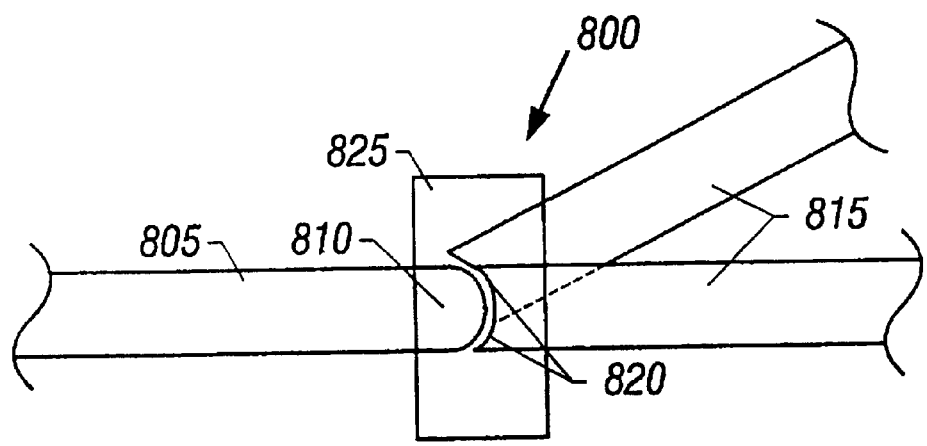
FIGS. 8A and 8B are side and bottom views of a waveguide joint.
Figure 8B:
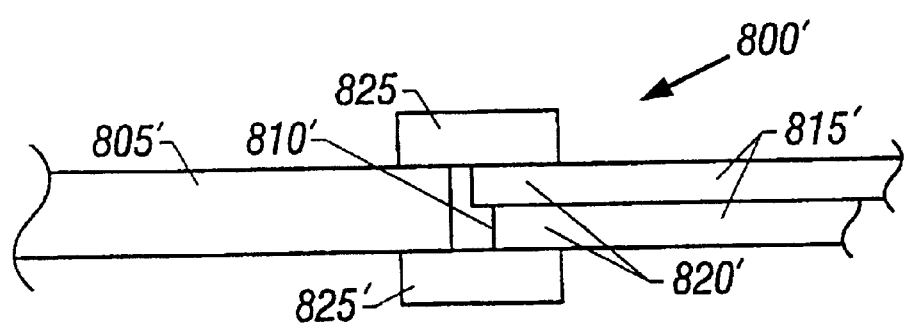

Referring to FIGS. 8A and 8B, a waveguide joint, 800' may be used to distribute light in the DLS. For example, the joint may be used to provide light to a door of the vehicle. The waveguide joint 800 has a trunk section 805 with a convex curved end 810. Branch sections 815 having convex curved ends 820 adjoin the trunk section 805. The branch sections may be held in place by a plastic band, 825' surrounding the joint region or by epoxy or snaps. Light input to the trunk section, 805' is essentially split among the branches, 815'. The branches, 815' may be positioned to carry light to different sections of the vehicle. With this configuration, it is possible to reconfigure the branches, 815' in the event of design changes. Epoxy that has an index of refraction approximately equal to that of the waveguide, i.e., that is index-matched, may be used to hold the branches, 815' in place. The joint, 800' may have only a single branch, 815' that is used to change the direction of the trunk, 805' or to provide a hinged connection. A hinged connection using the joint 800 may be installed, for example, in a car door. Index-matched fluid may be used to lubricate and reduce discontinuity at the interface between the trunk, 805' and the branch, 815', which will reduce the loss through the joint, 800'.

Figure 9A:
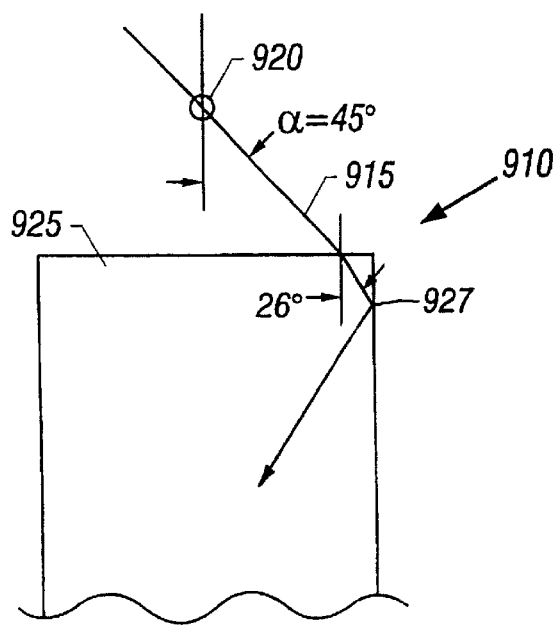
FIGS. 9A–9C are cross-section views of non-tapered and tapered waveguide inputs.
Figure 9B:
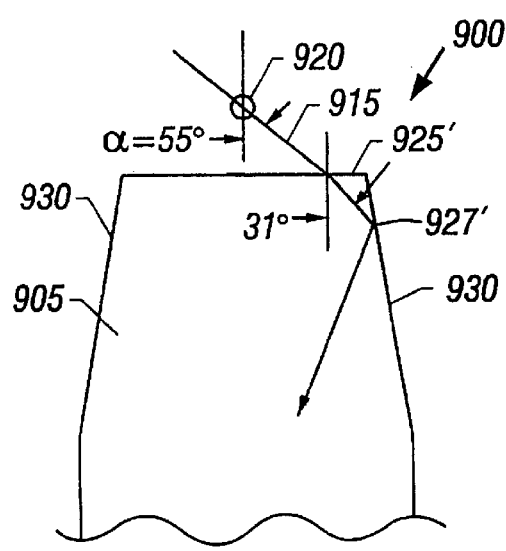
Figure 9C:
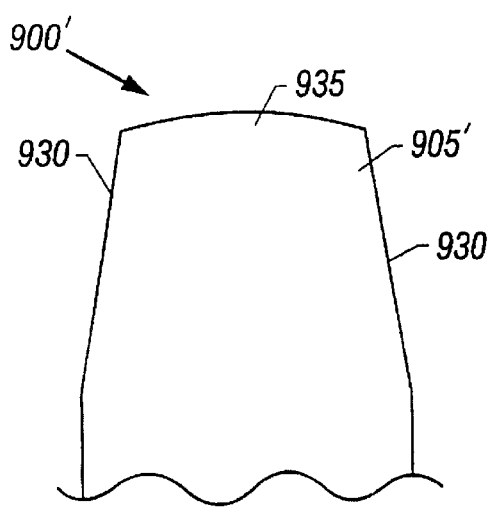

As shown in FIGS. 9A–C, a waveguide 900 may have a pinched end that acts as a collector element, 905'. The collector element 905 increases the acceptance angle ($\alpha$) of the waveguide, 900' and thereby increases light collection efficiency. The end of the waveguide 900 may be pinched in two dimensions to form an essentially trapezoidally shaped collector element, 905'. The collector element, 905' may be formed on the end of a waveguide, 900' having a cross-section that is rectangular, round, or other shapes.

For example, FIG. 9A shows a waveguide 910 without a pinched end. Light 915 from a light source 920 enters the waveguide 910 at an angle of 45°. At the input face 925, the light is bent in accordance with Snell's Law to form an angle of 26° with respect to a direction perpendicular to the input face 925. The light reaches the outer edge 927 of the waveguide at an angle of 26° and is confined within the waveguide by internal reflection.

FIG. 9B shows a waveguide 900 with a pinched end. Light enters the input face at an angle of 55°. Hence, the acceptance angle of the pinched waveguide 900 can be made greater than the acceptance angle of the waveguide 910 without the pinched end. At the input face, 925', the light is bent to form an angle of 31° with respect to a direction perpendicular to the input face 925'. The light reaches the outer edge 927' of the waveguide at an angle of 26° (since the inclined walls 930 of the pinched portion are angled inward by 5°) and is confined within the waveguide by internal reflection.

As shown in FIG. 9C, the pinched end of the waveguide 900' may be formed so that an excess of material at the tip of the waveguide 900' bulges outward to form a lens 935 with a desired focal length. The lens 935 focuses received light, further increasing the acceptance angle of the waveguide 900.

Figure 10A:
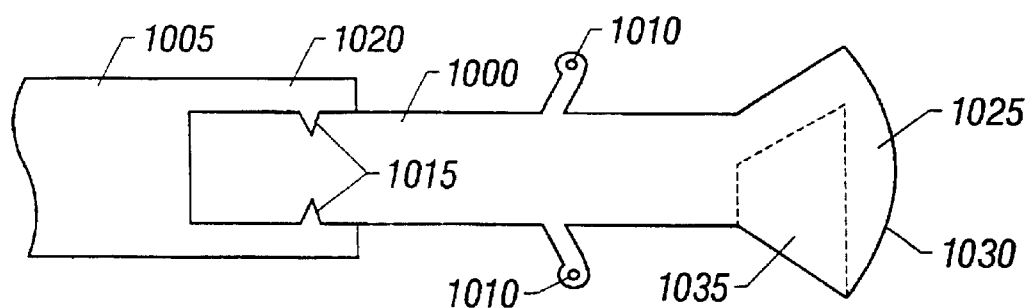
FIGS. 10A and 10B are cross-section views of waveguide sections having integrated installation components and an integrated output structure.

The waveguides may be formed as a set of standard components that may be easily interconnected and used as building blocks for different applications. For example, FIG. 10A shows waveguides 1000 and 1005 having integrated installation elements, such as snaps 1010 and detents 1015. Snaps 1010 can be formed during the injection molding of the waveguide 1000 and provide a convenient means for securing the waveguide 1000 within the vehicle. The snaps are sized and angled to minimize light loss through the snap. For example, the snap may form a 60° angle with the waveguide (toward the direction that light is travelling though the waveguide). The vehicle may have brackets to receive the snaps 1010 or a screw may be inserted into a snap 1010 to secure the waveguide to a mounting surface. The detents 1015 enable the waveguide 1000 to be securely connected to another waveguide 1005 having an integrated claw structure 1020. Each waveguide may be formed with a detent 1015 at one end and a claw structure 1020 at the other.

Figure 10B:
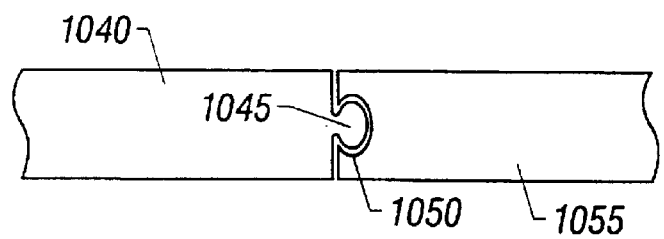

FIG. 10B shows waveguides with integrated connection elements. A waveguide 1040 may have a key 1045 formed at one end. The key 1045 is configured to mate with a socket 1050 of another waveguide 1055. These connection elements may cause a loss of approximately 4% at each interface, however, the connection elements increase the ease with which waveguide components can be installed. Index-matched epoxy or fluid may be used at the interface to secure the connection and reduce losses.

In addition to the installation and connection elements, the waveguide 1000 widens at one end into an output element 1025 having a convex curved surface 1030. The curved surface 1030 of the output element 1025 essentially acts as a lens to provide a desired light output characteristic. The output element 1025 may form an illumination element for the vehicle, e.g., a courtesy light in the door of a vehicle. A portion of the widened waveguide end may be eliminated, leaving an air gap 1035, while maintaining desired output characteristics. The air gap 1035 decreases the weight and cost of the waveguide 1000.

Figure 11:
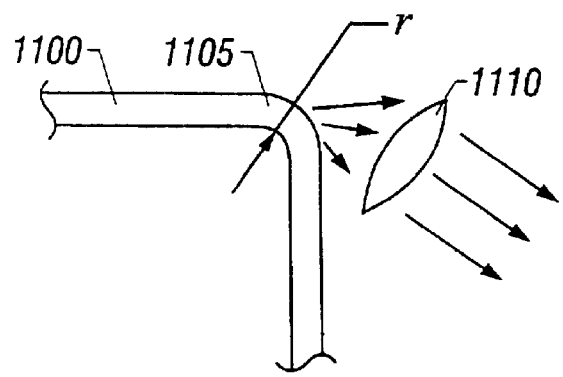
FIG. 11 shows a leaky waveguide bend and focusing lens.

Another configuration for an output element is shown in FIG. 11. A waveguide 1100 has a bend 1105 that is configured to allow a portion of the light travelling in the waveguide to escape at the bend 1105. A lens 1110 may be used to focus the light to form a desired beam pattern. The amount of light released at the bend 1105 (or reflected back toward the input) can be controlled by determining the inner radius (r) of curvature of the bend 1105 relative to the width (w) of the waveguide 1100. For example, a bend with a inner bend radius to waveguide width ratio (r/w) of 3:1 will result in a loss of less than 5% of the total light in the waveguide (the losses including light released at the bend and light reflected back toward the input). A bend ratio of 1:1 will result in a loss of approximately 30–35%, and a bend ratio of 0.1:1 will result in a loss of approximately 65–70%. Not all of the light lost in the waveguide enters the lens, however the amount of light entering the lens will be proportional to the amount of light released at the bend.

Figure 12A:
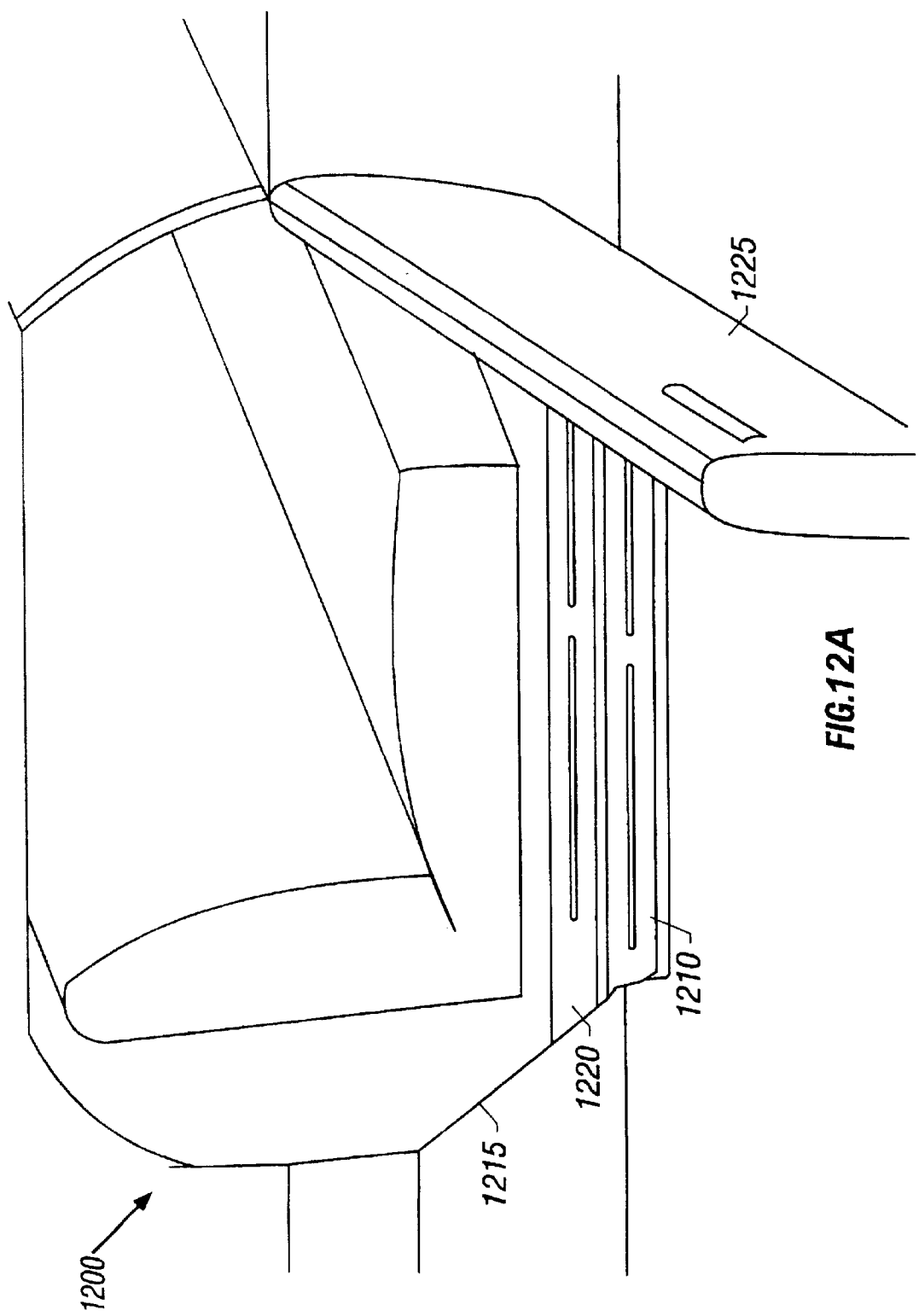
FIGS. 12A–12H show illuminated step-ups and running boards.

A DLS may be used to provide lighting for vehicle step-ups and running boards. As shown in FIG. 12A, a running board 1210 forms a ledge that extends outward from the vehicle 1200 at the base of a door opening 1215. A step-up 1220 is a plate that runs along the door sill at the bottom of the door opening 1215. The step-up 1220 is visible when the door 1225 is open and is covered when the door is closed.

Figure 12B:
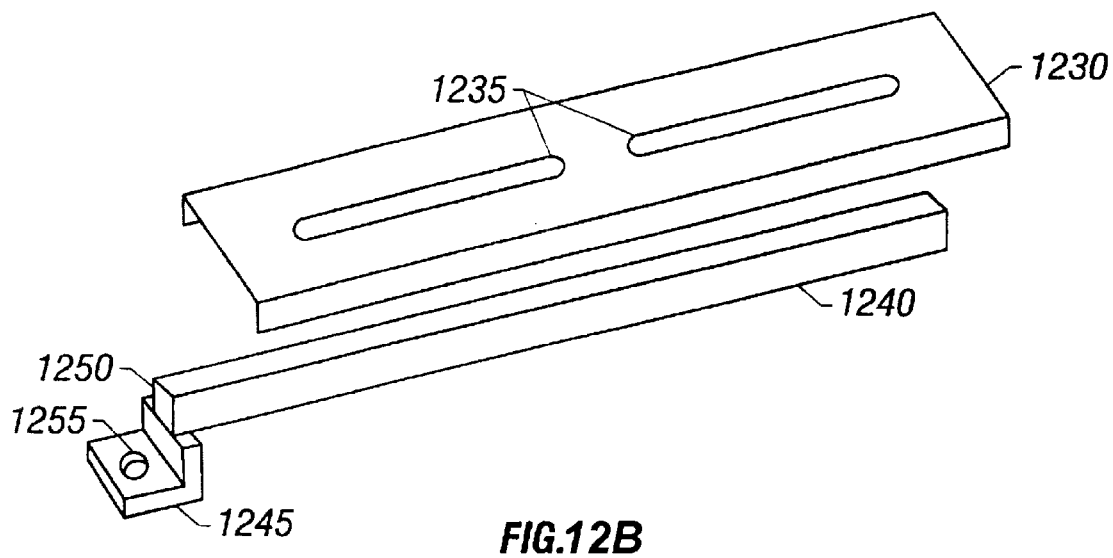
Figure 12C:
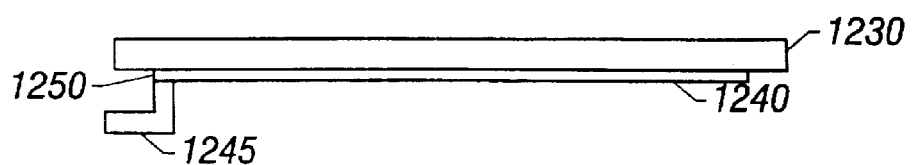

As shown in FIGS. 12B and 12C, an illuminated step-up or running board has a cover plate 1230 with slots 1235 that run along the length of the plate 1230. The slots 1235 may be covered by a protective plastic plug. A waveguide 1240 is positioned under the plate 1230 so that it runs directly beneath the slots 1235. The waveguide 1240 is configured to gradually release light along its length, as discussed below. A portion of the light released by the waveguide passes through the slots 1235. The waveguide 1240 may continue beyond the end of the step-up or running board to provide light for other lighting functions, such as another step-up or running board. The waveguide 1240 may be chemically hardened to improve durability. A plastic shield (not shown) may be positioned between the waveguide 1240 and the cover plate 1230.

A light receptacle 1245 is positioned at the end of the waveguide 1240 to hold a light source (e.g. a PC bulb) in position near the waveguide input face 1250. The receptacle 1245 may be formed together with the waveguide 1240 as a solid piece of material. The PC bulb is inserted into an opening 1255 in the receptacle 1245. The opening 1255 may have slots (not shown) that mate with locking tabs on the base of the PC bulb. Other types of light sources also may be used. For example, a waveguide carrying light from a remote source (such as a bulb positioned within another step-up or running board) may connected to the waveguide input face 1250. As a further example, a compact illuminator, as shown in FIGS. 3A and 3B, may be used as a source. A colored filter may be positioned between the light source and the waveguide input face 1250.

Figure 12D:
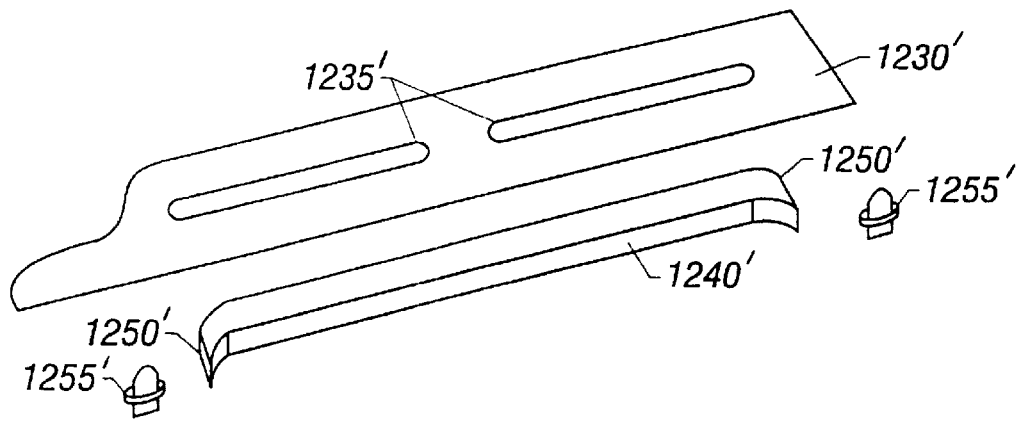
Figure 12E:
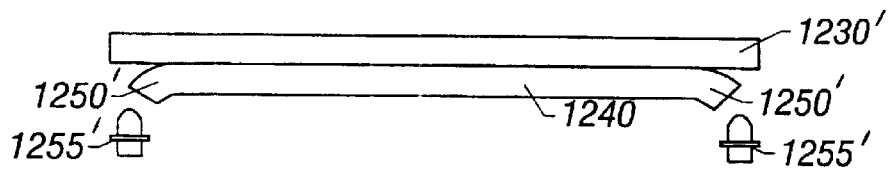

FIGS. 12D and 12E show an alternative configuration for an illuminated step-up or running board. A waveguide 1240' is positioned beneath a cover plate 1230' having slots 1235'. The ends of the waveguide 1240' bend toward light sources 1255' that are positioned at each end. Such a configuration provides a brighter, more uniform lighting distribution along the length of the step-up or running board. In addition, the light sources 1255' provide redundancy. If one light source fails, illumination is still provided by the other light source, although at a reduced level.

Figure 12F:
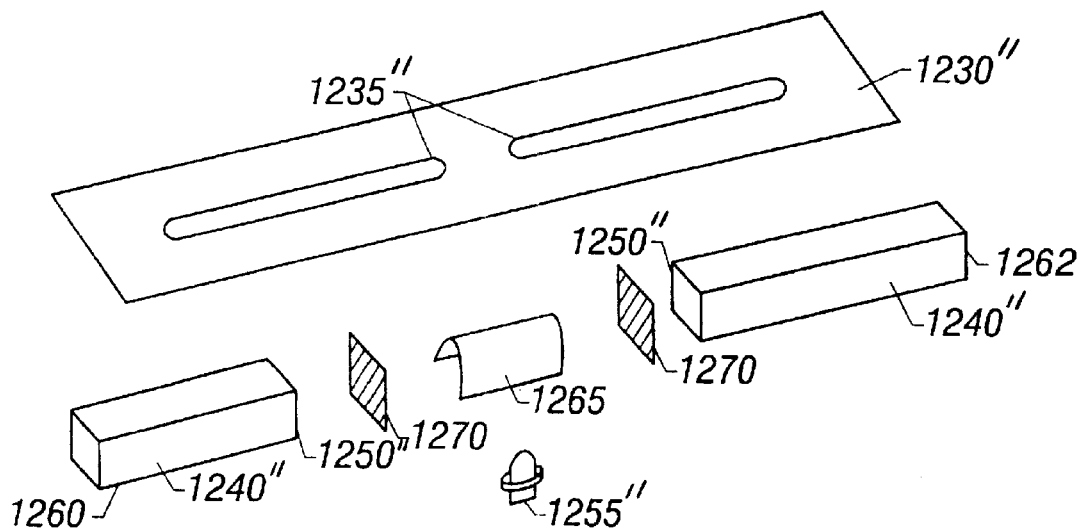
Figure 12G:
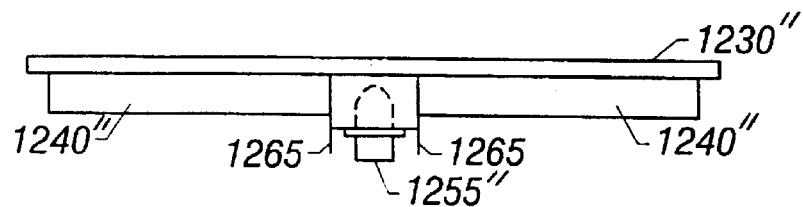

Another configuration for step-up or running board illumination is shown in FIGS. 12F and 12G. The waveguide 1240" is divided into two sections 1260 and 1262 having input faces 1250". A reflector unit 1265 is positioned between the input faces. A light source 1255" is positioned within the reflector unit 1265. Light from the light source 1255" enters the input faces 1250" of the two waveguide sections 1260 and 1262. The reflector 1265 improves the efficiency with which light is collected from the light source 1255" and reduces stray light leakage. Colored filters 1270 may be positioned between the light source 1255" and the input faces 1250".

A compact illuminator, as shown in FIGS. 3A and 3B also may be used as a light source for a step-up or running board. For example, the compact illuminator of FIG. 3A may be used in place of the reflector 1265 and light source 1255" described above with respect to FIGS. 12F and 12G.

The light source 1255" of the step-up or running board may act as a hybrid source, i.e., provide both a direct and indirect lighting function. For example, the light source may illuminate the step-up or running board through the waveguide sections 1260 and 1262 (indirect lighting function) and may provide a puddle light to illuminate the underside of the vehicle through a lens positioned beneath the light source 1255" (direct lighting function).

Figure 12H:
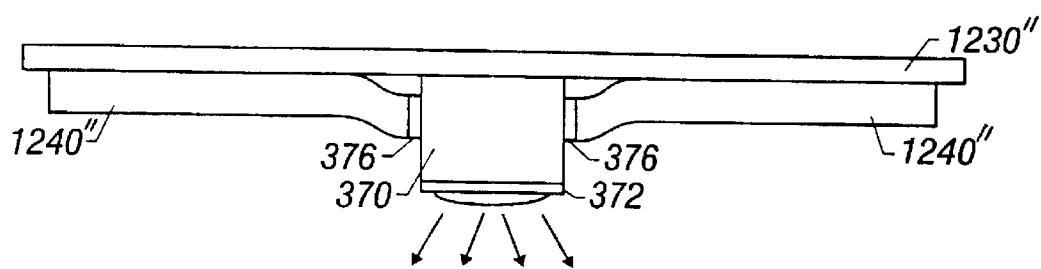

Alternatively, as shown in FIG. 12H, the hybrid compact illuminator 370 of FIG. 3B may provide light for the step-up or running board through its waveguide outputs 376 (indirect lighting function) and may provide a puddle light through its lens output 372 (direct lighting function).

The waveguides used in the step-ups and running boards are configured to release or leak light along their length. The surfaces of the waveguide may be roughed or stippled for this purpose. In addition, diffusive material, such as diffusion tape, may be applied to the waveguide surfaces. The diffusion tape or other diffusive material may be tapered or shaped to provide a desired lighting distribution along the length of the waveguide. For example, the diffusive material may applied so that the light leakage increases gradually in the direction away from the light source. Such a configuration leads to a more uniform, aesthetic light distribution, since it tends to counteract any decrease in the amount of light available in the waveguide in the direction away from the light source.

The illuminated step-ups and running boards provide aesthetically pleasing and functional lighting effects for a vehicle. The optical waveguide configurations employed in these lighting assemblies provide several advantages. For example, the step-ups and running boards are illuminated along their lengths without the use of long, tubular light sources, such as neon or fluorescent tubes, that may be susceptible to failure and breakage. This feature is particularly important because the step-ups and running boards are located where they may suffer impacts as people enter or exit a vehicle. In addition, the waveguides may be formed from injection-molded plastic, extruded plastic or acrylic, resulting in increased durability and reduced manufacturing and installation cost compared to fiber optics or other types of light transmission conduits.

Other embodiments are within the scope of the following claims.

What is claimed is:

1. An illuminated step-up for a vehicle, comprising:
   a step-up plate having an upper step surface which is disposed in a horizontal orientation when the step-up plate is mounted to a vehicle at the vehicle's door sill, wherein the upper step surface defines a generally horizontal plane,
   a slot formed in the upper step surface and extending along a portion of a length of the step-up plate, and
   an optical waveguide positioned at the slot, below the horizontal plane to release light upwardly through the slot, the waveguide being formed from a solid piece of material.

2. The illuminated step-up of claim 1, further comprising:
   an illumination portion of the waveguide having a top surface and a bottom surface and configured to release light from the top surface, and
   a first input face at an end of the illumination portion, the first input face configured to receive light from a first light source.

3. The illuminated step-up of claim 2, further comprising a second input face at an opposite end of the illumination portion, the second input face configured to receive light from a second light source.

4. The illuminated step-up of claim 2, wherein the bottom surface is stippled.

5. The illuminated step-up of claim 2, wherein the top surface is stippled.

6. The illuminated step-up of claim 2, wherein the bottom surface is at least partially covered with diffusing material.

7. The illuminated step-up of claim 2, wherein the top surface is at least partially covered with diffusing material.

8. The illuminated step-up of claim 1, wherein the waveguide is divided into first and second portions, the step-up further comprising a reflector positioned between the first and second portions of the waveguide and configured to receive a light source and direct light into the first and second portions.

9. The illuminated step-up of claim 8, further comprising colored filters positioned between the reflector and the first and second portions.

10. The illuminated step-up of claim 2, further comprising snaps extending from the top surface and configured to mount the illumination portion on the step-up plate.

11. The illuminated step-up of claim 2, further comprising a light source receptacle positioned to hold a light source at the first input face.

12. A vehicle including the illuminated step-up of claim 1.

13. An illuminated running board for a vehicle, comprising:
    a running board plate having an upper step surface that forms a ledge extending from the vehicle when the running board plate is mounted to the vehicle along a length of a vehicle door opening, wherein the upper step surface defines a generally horizontal plane,
    a slot formed in the upper step surface and extending along a portion of a length of the running board plate, and
    an optical waveguide positioned at the slot below the horizontal plane to release light upwardly through the slot, the waveguide being formed from a solid piece of material.

14. The illuminated running board of claim 13, further comprising:
    an illumination portion of the waveguide having a top surface and a bottom surface and configured to release light from the top surface, and
    a first input face at an end of the illumination portion, the first input face configured to receive light from a first light source.

15. The illuminated running board of claim 14, further comprising a second input face at an opposite end of the illumination portion, the second input face configured to receive light from a second light source.

16. The illuminated running board of claim 14, wherein the bottom surface is stippled.

17. The illuminated running board of claim 14, wherein the top surface is stippled.

18. The illuminated running board of claim 14, wherein the bottom surface is at least partially covered with diffusing material.

19. The illuminated running board of claim 14, wherein the top surface is at least partially covered with diffusing material.

20. The illuminated running board of claim 13, wherein the waveguide is divided into first and second portions, the running board further comprising a reflector positioned between the first and second portions of the waveguide and configured to receive a light source and direct light into the first and second portions.

21. The illuminated running board of claim 20, further comprising colored filters positioned between the reflector and the first and second portions.

22. The illuminated running board of claim 14, further comprising snaps extending from the top surface and configured to mount the illumination portion on the running board plate.

23. The illuminated running board of claim 14, further comprising a light source receptacle positioned to hold a light source at the first input face.

24. A vehicle including the illuminated running board of claim 13.

25. An illuminated step-up for a vehicle, comprising:
    a step-up plate mounted on the door sill of a vehicle, a slot extending along a portion of a length of the step-up plate, a light source positioned to provide downwardly-directed ground illumination under the step-up plate, and an optical waveguide positioned to receive light from the light source and to release the light upwardly through the slot to indirectly illuminate the step-up plate.

26. The illuminated step-up of claim 25, further comprising:

an illumination portion of the waveguide having a top surface and a bottom surface and configured to release light from the top surface, and a first input face at an end of the illumination portion, the first input face configured to receive light from a first light source.

27. The illuminated step-up of claim 26, further comprising a second input face at an opposite end of the illumination portion, the second input face configured to receive light from a second light source.

28. The illuminated step-up of claim 27, wherein the second light source is positioned to provide direct light under the step-up plate.

29. The illuminated step-up of claim 26, wherein the bottom surface is stippled.

30. The illuminated step-up of claim 26, wherein the top surface is stippled.

31. The illuminated step-up of claim 26, wherein the bottom surface is at least partially covered with diffusing material.

32. The illuminated step-up of claim 26, wherein the top surface is at least partially covered with diffusing material.

33. The illuminating step-up of claim 26, wherein the waveguide is divided into multiple portions, each portion having a first input face for receiving light from the light source.

34. The illuminating step-up of claim 33, further comprising a light source receptacle positioned to hold a light source, each of said multiple portions extending from said light source receptacle.

35. The illuminating step-up of claim 33, further comprising a reflector positioned between the multiple portions of the waveguide and configured to receive light from the light source and direct light into the multiple portions.

36. The illuminating step-up of claim 33, further comprising colored filters positioned between the reflector and the multiple portions.

37. An illuminating step-up for a vehicle, comprising:

a step-up plate mounted on the door sill of a vehicle, a slot extending along a portion of a length of the step-up plate, a light source positioned to provide direct light under the step-up plate, an optical waveguide positioned to receive light from the light source and to release the light through the slot to indirectly illuminate the step-up plate, an illumination portion of the waveguide having a top surface and a bottom surface and configured to release light from the top surface, the waveguide having a first input face at an end of the illumination portion, the first input face being configured to receive light from a first light source, and snaps extending from the top surface and configured to mount the illumination portion on the step-up plate.

38. The illuminating step-up of claim 26, further comprising a light source receptacle positioned to hold a light source at the first input face.

39. A vehicle including the illuminated step-up of claim 25.

40. An illuminated running board for a vehicle, comprising:

a running board plate positioned on the top surface of a running board that forms a ledge extending from the vehicle along a length of a vehicle door opening, a slot extending along a portion of a length of the running board plate, a light source positioned to provide downwardly-directed ground illumination under the running board plate, and an optical waveguide positioned to receive light from the light source and to release the light upwardly through the slot to indirectly illuminate the running board plate.

41. The illuminated running board of claim 40, further comprising:

an illumination portion of the waveguide having a top surface and a bottom surface and configured to release light from the top surface, and a first input face at an end of the illumination portion, the first input face configured to receive light from a first light source.

42. The illuminated running board of claim 41, further comprising a second input face at an opposite end of the illumination portion, the second input face configured to receive light from a second light source.

43. The illuminated running board of claim 42, wherein the second light source is positioned to provide direct light under the running board plate.

44. The illuminated running board of claim 41, wherein the bottom surface is stippled.

45. The illuminated running board of claim 41, wherein the top surface is stippled.

46. The illuminated running board of claim 41, wherein the bottom surface is at least partially covered with diffusing material.

47. The illuminated running board of claim 41, wherein the top surface is at least partially covered with diffusing material.

48. The illuminating running board of claim 41, wherein the waveguide is divided into multiple portions, each portion having a first input face for receiving light from the light source.

49. The illuminating running board of claim 48, further comprising a light source receptacle positioned to hold a light source, each of said multiple portions extending from said light source receptacle.

50. The illuminating running board of claim 49, further comprising a reflector positioned between the multiple portions of the waveguide and configured to receive light from the light source and direct light into the multiple portions.

51. The illuminating running board of claim 49, further comprising colored filters positioned between the reflector and the multiple portions.

52. An illuminating running board for a vehicle, comprising:

a running board plate positioned on the top surface of a running board that forms a ledge extending from the vehicle along a length of a vehicle door opening, a slot extending along a portion of a length of the running board plate, a light source positioned to provide direct light under the running board plate, an optical waveguide positioned to receive light from the light source and to release the light through the slot to indirectly illuminate the running board plate, an illumination portion of the waveguide having a top surface and a bottom surface and configured to release light from the top surface, the waveguide having a first input face at an end of the illumination portion, the first input face configured to receive light from a first light source, and snaps extending from the top surface and configured to mount the illumination portion on the step-up plate.

53. The illuminating running board of claim 41, further comprising a light source receptacle positioned to hold a light source at the first input face.

54. A vehicle including the illuminated running board of claim 40.

* * * * *

UNITED STATES PATENT AND TRADEMARK OFFICE
CERTIFICATE OF CORRECTION

PATENT NO.   : 6,244,734 B1
DATED        : June 12, 2001
INVENTOR(S)  : George R. Hulse It is certified that error appears in the above-identified patent and that said Letters Patent is hereby corrected as shown below:

Column 2,
Line 57, after "subsystems" insert therein -- 105, front and rear --.
Line 58, delete "and," and insert therefor -- and 140, respectively --.

Column 6,
Line 9, after "joint" insert therein -- 800 --.
Line 15, after "band" insert therein -- 825 --.
Line 17, after "section" insert therein -- 805 --.
Line 18, after "branches" (both occurrences) insert therein -- 815 --.
Line 20, after "branches" insert therein -- 815 --.
Line 23, after "branches" insert -- 815 --.
Line 24, after "joint" insert therein -- 800 --.
Line 24, after "branch" insert therein -- 815 --.
Line 25, after "trunk" insert therein -- 805 --.
Line 29, after "trunk" insert therein -- 805 --.
Line 30, delete ", 815´," and insert therein -- 815, 815´ --.
Line 30, after "joint" insert therein -- 800 --.
Line 32, after "900" insert therein -- , 900´ --.
Line 33, after "element" insert therein -- 905 --.
Line 34, after "905" insert therein -- , 905´ --.
Line 35, after "waveguide" insert therein -- 900 --.
Line 38, delete ", 905´" (first occurrence) and insert therein -- 905 --.
Line 38, after "element" (second occurrence) insert therein -- 905 --.
Line 39, after "waveguide" insert -- 900 --.
Line 53, after "face" delete ",".

Signed and Sealed this

Eleventh Day of June, 2002

*Attest:*

*Attesting Officer*

JAMES E. ROGAN
*Director of the United States Patent and Trademark Office*